May 8, 1962
E. C. MAKIN, JR
3,033,763
SEPARATION OF CYCLIC AND ACYCLIC HYDROCARBONS
BY EXTRACTIVE DISTILLATION
Filed Oct. 31, 1958
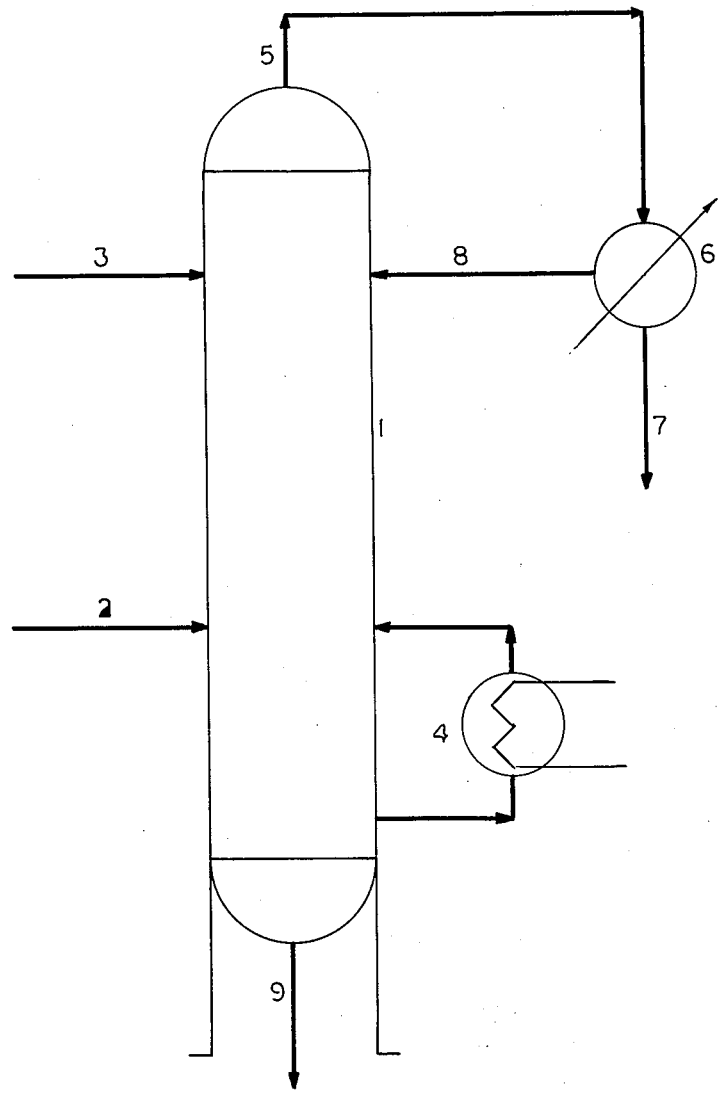
EARLE C. MAKIN JR.
*INVENTOR.*
BY
ATTORNEY

United States Patent Office 3,033,763
Patented May 8, 1962

3,033,763
SEPARATION OF CYCLIC AND ACYCLIC HYDROCARBONS BY EXTRACTIVE DISTILLATION
Earle C. Makin, Jr., El Dorado, Ark., assignor to Monsanto Chemical Company, St. Louis, Mo., a corporation of Delaware
Filed Oct. 31, 1958, Ser. No. 771,061
6 Claims. (Cl. 202—39.5)

This invention relates to the separation of mixtures of hydrocarbons and more particularly to the separation of mixtures of acyclic and cyclic hydrocarbons containing six carbon atoms.

Aromatic hydrocarbons can be prepared by the dehydrocyclization of aliphatic hydrocarbons containing six carbon atoms. Petroleum refinery streams can be treated or processed to produce a mixture of hydrocarbons containing six carbon atoms. Such a mixture, when obtained by conventional operations, contains acyclic, alicyclic and aromatic hydrocarbons. In order to efficiently dehydrocyclize the $C_6$ acyclic hydrocarbons to aromatics it is necessary that the alicyclic substituents of the hydrocarbon mixture be removed. Due to the closeness of the boiling points of the various isomeric $C_6$ hydrocarbons present in such mixtures obtained by the more conventional methods of operation, such a separation is most difficult.

It is an object of this invention to provide an improved method for the separation of cyclic hydrocarbons from a hydrocarbon mixture consisting essentially of acyclic and cyclic hydrocarbons each containing six carbon atoms. Additional objects will become apparent from the description of the invention.

It has now been discovered that cyclic hydrocarbons contained in a feed mixture consisting essentially of acyclic and cyclic hydrocarbons each containing six carbon atoms can be effectively separated from said feed mixture by an extractive distillation process which comprises continuously introducing said feed mixture into an intermediate section of a fractionating column, continuously introducing a solvent into said fractionating column at a point above the point of introduction of said feed mixture so that said solvent flows countercurrent to and intimately contacts the ascending vapors of said feed mixture, withdrawing overhead a mixture of acyclic hydrocarbons substantially free of cyclic hydrocarbons and removing from the bottom section of said column a solution of cyclic hydrocarbons contained in said solvent, said solvent introduced into said fractionating column being a mixture comprising from about 90 to about 50 volume percent of phenol and from about 10 to about 50 volume percent of a glycol having the formula HO—R—OH wherein R represents a radical selected from the group consisting of alkylene and oxa-alkylene radicals having a molecular weight from 28 to 116.

The invention may be illustrated by reference to the drawing in which an embodiment of the invention is schematically represented. A feed mixture of hydrocarbons to be separated is introduced into fractionating column 1 through line 2. The liquid in the lower part of the column is vaporized by heat supplied by reboiler 4. The solvent is introduced in the liquid phase at the top of the column through line 3 and flows down the column countercurrent to the rising vapors. The vapors passing upwardly through the descending solvent are withdrawn overhead through line 5, passed through condenser 6 where they are liquified, a portion returned to the column through line 8 as reflux and a portion recovered through line 7 for further use and/or processing. The solvent having dissolved therein cyclic hydrocarbons is removed from the column through line 9 and the cyclic hydrocarbons recovered if desired.

The following examples are specific illustrations of the novel process of this invention:

*Example I*

In order to effect the separation of hydrocarbons in accordance with the process of this invention a fractionating column containing 60 perforated trays was employed. The hydrocarbon feed mixture had the following composition:

| Hydrocarbon: | Volume percent |
|---|---|
| 2-methylpentane | 7.1 |
| 3-methylpentane | 10.1 |
| n-Hexane | 49.5 |
| Methylcyclopentane | 14.1 |
| Cyclohexane | 15.2 |
| Benzene | 3.5 |
| 2,4-dimethylpentane | 0.5 |

The hydrocarbon feed mixture was introduced on the 21st tray. A pot temperature of 125.2–125.5° C. was maintained. The solvent, a mixture of 90 volume percent of phenol and 10 volume percent of ethylene glycol, was introduced on the top tray of the column at a temperature of 80.5–81.0° C. The column was operated on a continuous basis maintaining a volume ratio of solvent:oil of 8.95:1.0. A 5:1 reflux ratio was maintained. The distillate obtained represented 58 volume percent of the feed mixture and had the following composition:

| Hydrocarbon: | Volume percent |
|---|---|
| 2-methylpentane | 11.4 |
| 3-methylpentane | 18.4 |
| n-Hexane | 69.3 |
| Methylcyclopentane | Trace |
| Cyclohexane | none |
| Benzene | None |
| 2,4-dimethylpentane | 0.9 |

*Example II*

The procedure set forth in Example I was repeated using the same hydrocarbon mixture specified therein. The solvent comprised 85 volume percent of phenol and 15 volume percent ethylene glycol. The solvent feed temperature was 80.2–81.0° C. and the pot temperature was 124.7–125.5° C. The volume ratio of solvent:oil was 8.0:1.0. The column was operated on a continuous basis at a reflux ratio of 5:1. The distillate, representing 59 volume percent of the feed mixture, had the follow-

| Hydrocarbon: | Volume percent |
|---|---|
| 2-methylpentane | 11.2 |
| 3-methylpentane | 17.9 |
| n-Hexane | 69.2 |
| Methylcyclopentane | Trace |
| Cyclohexane | None |
| Benzene | None |
| 2,4-dimethylpentane | 1.7 |

*Example III*

The procedure set forth in Example I was repeated using a hydrocarbon feed mixture having the following composition:

| Hydrocarbon: | Volume percent |
|---|---|
| 2-methylpentane | 8.4 |
| 3-methylpentane | 10.7 |
| n-Hexane | 44.2 |
| Methylcyclopentane | 15.3 |
| Cyclohexane | 14.9 |
| Benzene | 3.8 |
| 2,4-dimethylpentane | 0.8 |

The solvent was a mixture comprising 80 volume percent phenol and 20 volume percent ethylene glycol. The solvent feed temperature was 77.2–79.5° C. and the pot temperature was 124.9–134.8° C. The volume ratio of solvent:oil was 8.0:1.0. The column was operated on a continuous basis and operated at a reflux ratio of 5:1. The distillate, representing 45 volume percent of the feed, had the following composition:

| Hydrocarbon: | Volume percent |
|---|---|
| 2-methylpentane | 16.4 |
| 3-methylpentane | 17.3 |
| n-Hexane | 62.2 |
| Methylcyclopentane | 0.9 |
| Cyclohexane | None |
| Benzene | None |
| 2,4-dimethylpentane | Trace |

*Example IV*

The procedure set forth in Example I is repeated using the hydrocarbon feed mixture specified therein and a solvent mixture comprising 85 volume percent phenol and 15 volume percent triethylene glycol. The distillate is substantially free of cyclic hydrocarbons.

*Example V*

The procedure set forth in Example I is repeated using the hydrocarbon feed mixture specified therein and a solvent mixture comprising 75 volume percent phenol and 25 volume percent propylene glycol. The distillate is substantially free of cyclic hydrocarbons.

*Example VI*

The procedure set forth in Example I is repeated using the hydrocarbon feed mixture specified therein and a solvent mixture comprising 60 volume percent phenol and 40 volume percent diethylene glycol. The distillate is substantially free of cyclic hydrocarbons.

*Example VII*

The procedure set forth in Example I is repeated using the hydrocarbon feed mixture specified therein and a solvent mixture comprising 90 volume percent and 10 volume percent dipropylene glycol. The distillate is substantially free of hydrocarbons.

As a solvent for the novel process of this invention and glycol having the formula HO—R—OH wherein R represents a radical selected from the group consisting of alkylene and oxa-alkylene radicals having a molecular weight from 28 to 116 may be mixed with phenol in the heretofore set forth proportions. The glycols that can be used in the process of this invention include ethylene glycol, propylene glycol, tetramethylene glycol, pentamethylene glycol, hexamethylene glycol, diethylene glycol, triethylene glycol, dipropylene glycol and so forth.

Any fractionating column of conventional design providing for countercurrent liquid-vapor contact under reboiling and refluxing conditions may be employed. The column can be a packed column or it can be equipped with perforated plates or bubble cap trays. The number of theoretical plates in the column depends on efficiency of separation desired, the precise composition of the feed mixture, the quantity of solvent, the reflux ratio, and other related factors well known to those skilled in the art. Under certain conditions five theoretical plates are adequate while under more adverse conditions as high as a hundred theoretical plates may be required.

The hydrocarbon feed mixture separated in accordance with this invention consists essentially of acyclic and cyclic hydrocarbons all containing six carbon atoms. Very small amounts of other hydrocarbons can be tolerated in the mixture but such hydrocarbons should be kept to a minimum as they can interfere with the efficiency of this particular extractive distillation.

The hydrocarbon feed mixture is preferentially introduced into the fractionating column in an intermediate section. The solvent is introduced at a point above the introduction of the hydrocarbon feed mixture and preferably near the top of the column. Both solvent and hydrocarbon feed mixture are introduced continuously. The solvent feed temperature can vary substantially and is adjusted to maintain steady state conditions in the column.

The quantity of solvent required to be introduced continuously into the column in order to accomplish the desired separation can vary over rather wide limits depending upon the efficiency of separation desired. Generally, at least two parts by volume of solvent for each part by volume of hydrocarbon mixture is necessary to effect any efficient degree of separation. The quantity of solvent used can be increased to as high as 10 and at times even as high as 20 volumes per volume of hydrocarbon mixture. As dilution of the internal reflux becomes infinite, separation becomes sharper but operating efficiency is lowered considerably because of the relatively small quantity of hydrocarbon feed mixture being processed as infinite reflux is approached. Too large an excess of solvent is, therefore, to be avoided.

Although generally the extractive distillation of this invention is to be carried out at about atmospheric pressure, as illustrated in the examples, it may be conducted below, or above atmospheric pressure.

The reflux ratio can be varied considerably in the proper operation of this extractive distillation process and the exact ratio will be dependent upon the operating characteristics of the column, the quantity of solvent employed and the degree of separation desired.

The cyclic hydrocarbons contained in the solvent can be recovered by any technique well known to those skilled in the art. Generally, a simple distillation is all that is required.

What is claimed is:

1. A continuous process for the separation of cyclic hydrocarbons from a hydrocarbon feed mixture consisting essentially of acyclic and cyclic hydrocarbons all containing six carbon atoms which comprises continuously introducing said feed mixture into an intermediate section of a fractionating column, continuously introducing a solvent into said fractionating column at a point above the point of introduction of said feed mixture so that said solvent flows countercurrent to and intimately contacts the ascending vapors of said feed mixture, withdrawing overhead a mixture of acyclic hydrocarbons substantially free of cyclic hydrocarbons and removing from the bottom section of said column a solution of cyclic hydrocarbons contained in said solvent, said solvent introduced into said fractionating column being a mixture comprising from about 90 to about 50 volume percent of phenol and from about 10 to about 50 volume percent of a glycol having the formula HO—R—OH wherein R represents a radical selected from the group consisting of alkylene and oxa-alkylene radicals having a molecular weight from 28 to 116 and said solvent being introduced into the column at a solvent to feed ratio of about 2:1 to 20:1.

2. The process as described in claim 1 wherein the glycol is ethylene glycol.

3. The process as described in claim 1 wherein the glycol is triethylene glycol.

4. The process as described in claim 1 wherein the glycol is propylene glycol.

5. The process as described in claim 1 wherein the glycol is diethylene glycol.

6. The process as described in claim 1 wherein the glycol is dipropylene glycol.

References Cited in the file of this patent

UNITED STATES PATENTS

| | | |
|---|---|---|
| 2,168,691 | Voorhees | Aug. 8, 1939 |
| 2,290,636 | Deanesly | July 21, 1942 |
| 2,366,360 | Semon | Jan. 2, 1945 |
| 2,370,530 | Gage | Feb. 27, 1945 |
| 2,406,695 | Lake | Aug. 27, 1946 |
| 2,415,192 | Rittenhouse | Feb. 4, 1947 |
| 2,460,852 | Shiras et al. | Feb. 8, 1949 |
| 2,609,333 | Boyd | Sept. 2, 1952 |
| 2,775,627 | Lavander | Dec. 25, 1956 |
| 2,891,894 | Cier et al. | June 23, 1959 |

OTHER REFERENCES

Weissberger: "Distillation," pages 325–340 (1951).

UNITED STATES PATENT OFFICE
CERTIFICATE OF CORRECTION

Patent No. 3,033,763                 May 8, 1962

Earle C. Makin, Jr.

It is hereby certified that error appears in the above numbered patent requiring correction and that the said Letters Patent should read as corrected below.

Column 2, line 54, after "follow-" insert -- ing composition: --; column 3, line 53, after "percent" insert -- phenol --; same column, line 57, for "and" read -- any --.

Signed and sealed this 28th day of August 1962.

(SEAL)
Attest:

ESTON G. JOHNSON               DAVID L. LADD
Attesting Officer                Commissioner of Patents